3,465,019
METHOD FOR MAKING ORGANOFUNCTIONAL-ALKYLSILICONHYDRIDES
Abe Berger, Schenectady, N.Y., assignor to General Electric Company, a corporation of New York
No Drawing. Filed Dec. 20, 1967, Ser. No. 691,930
Int. Cl. C07f 7/08
U.S. Cl. 260—448.2                                   11 Claims

ABSTRACT OF THE DISCLOSURE

A method is provided for redistributing hydrogen atoms attached to silicon and halogen atoms attached to silicon, utilizing a tertiary amine catalyst at elevated temperatures. An organosilane having three hydrogen atoms attached to silicon is used in combination with an organofunctional-halosilane, to provide for the production of an organofunctional-alkylsiliconhydride of the formula, $$QSiY(Y')H$$

where Q is an organofunctional radical, such as an aliphatically unsaturated monovalent hydrocarbon radical, or a radical selected from haloalkyl, cyanoalkyl, isocyanatoalkyl, organothio, organosulfonyl, etc., Y is a halogen radical, and Y' is a member selected from Y and monovalent hydrocarbon radicals.

---

The present invention relates to a method for making certain organofunctional-siliconhydrides. More particularly, the present invention relates to a method which comprises effecting reaction between an organosilicon trihydride and certain organofunctional-halosilanes in the presence of a tertiary-amine catalyst.

As taught in my copending application, Ser. No. 355,464, filed Mar. 27, 1964, now U.S. Patent 3,362,977, and assigned to the same assignee as the present invention, valuable results are achieved with alkylsilicontrihydrides in redistribution reactions with aluminum chloride. Such alkylsilicontrihydrides are employed in combination with various organohalosilanes in the presence of aluminum chloride to provide for the production of a variety of alkylhalosilanes by the redistribution of hydrogen atoms and halogen atoms. Although valuable results are achieved by such methods, those skilled in the art know that aluminum chloride can not be employed as a catalyst to effect the redistribution of hydrogen atoms and halogen atoms in mixtures containing organofunctional radicals such as nitrile radicals, isocyanate radicals, or other organofunctional radicals, such as aliphatically unsaturated radicals, or halogen atoms directly attached to carbon atoms. For example, aluminum chloride readily forms stable complexes with nitrile radicals. In instances where aluminum chloride is employed in the presence of halogen atoms attached to carbon, elimination of HCl is readily effected resulting in the formation of unsaturated hydrocarbon radicals. It would be desirable therefore to utilize the valuable results achieved with alkylsilicontrihydrides in redistribution reactions, as taught in my above copending application, to provide for the production of various organofunctional-siliconhydrides.

The present invention is based on the discovery that redistribution of hydrogen atoms and halogen atoms attached to silicon can be effected in reaction mixtures containing various organo-functional radicals without undesirable side reactions, if the redistribution is performed in the presence of a tertiary-amine catalyst at an elevated temperature. As a result, a variety of novel organofunctional-siliconhydrides can be made at significantly high yields.

In accordance with the present invention, there is provided a method for making an organofunctional alkyl-siliconhydride of the formula, (1)                $$QSiY(Y')H$$

which comprises (1) heating a mixture of (A) an organosilicon hydride of the formula, (2)                 $$RSiH_3$$

(B) an organofunctional-halosilane of the formula, (3)                 $$QSiY_2Y'$$

and (C) a tertiary-amine, and (2) recovering the organofunctional-alkylsiliconhydride from the mixture of (1), where there is utilized in said mixture of (1), from about 1.5 to 6 moles of (B), per mole of (A), and at least about 0.5 mole percent of (C), based on the total moles of (A), (B) and (C), Q is a monovalent organofunctional radical selected from aliphatically unsaturated monovalent hydrocarbon radicals, haloalkyl radicals having 3 to 8 carbon atoms, cyanoalkyl radicals, isocyanatoalkyl radicals, organothioalkyl radicals, organosulfonylalkyl radicals, alkoxyalkyl radicals and fluoroalkoxyalkyl radicals, R is a member selected from alkyl radicals and alkaryl radicals, Y is a halogen radical, Y' is a member selected from Y and monovalent hydrocarbon radicals.

Radicals included by R of Formula 1 are, for example, alkyl radicals such as hexyl, heptyl, octyl, nonyl, decyl, dodecyl, etc.; alkaryl radicals, such as ethylenebenzene, trimethylenebenzene, etc. Radicals included by Y are, for example, chloro, bromo, iodo and fluoro. Radicals included by Y' are, for example, aryl radicals, such as phenyl, tolyl, xylyl, naphthyl, etc.; alkyl radicals such as methyl, ethyl, propyl, butyl, pentyl, hexyl, etc. Radicals included by Q are, for example, cyanoalkyl radicals such as cyanoethyl, cyanopropyl, cyanobutyl, cyanopentyl, etc., aliphatically unsaturated hydrocarbon radicals, such as ethynyl, vinyl, allyl,

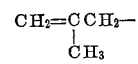

etc., haloalkyl radicals such as chloropropyl, bromobutyl, fluoropentyl, etc., organothioalkyl radicals such as $$CH_3SCH_2CH_2-$$

, etc.; organosulfonylalkyl radicals such as

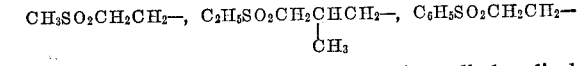

etc.; alkoxyalkyl radicals and fluoroalkoxyalkyl radicals, such as $CH_3OC_2H_4$, $CH_3CH_2OC_2H_4$, $C_3H_7OC_4H_9-$, $CF_3CH_2OCH_2CH_2$, etc.; isocyanatoalkyl radicals, such as $OCNCH_2CH_2CH_2-$, $OCN_2CH_2CH_2CH_2CH_2-$, etc. In the above formulae, where R and Y can be more than one radical, all of these radicals can be the same or any two or more of the aforementioned radicals respectively.

Included by the organosiliconhydride of formula (1) are, for example, hexylsilane, dodecylsilane, octadecylsilane, β-phenylethylsilane, heptylsilane, γ-phenylpropylsilane, decylsilane, pentadecylsilane, etc.

Methods for making these organosilicon hydrides are well known. For example, the reduction of the corresponding alkyltrihalosilane, such as hexyltrichlorosilane, can be achieved with a standard alkali metal hydride reducing agent such as lithium aluminum hydride. Other procedures are taught by Jenkner Patents 3,043,857, and 3,100,877. Methods for making the alkyltrihalosilane include, for example, the standard addition of a trihalosilane to an olefin, such as hexene or higher, in the presence of a platinum catalyst.

Included by the organofunctional-silanes of formula (2) are, for example, cyanoalkylhalosilanes, sulfonylalkylhalosilanes, haloalkylhalosilanes, isocyanatoalkylhalosilanes, organothioalkylhalosilanes and alkoxyalkylhalosilanes.

Cyanoalkylhalosilanes which are included are, for example, β - cyanoethyltrichlorosilane, γ - cyanopropyltrichlorosilane, ω - cyanobutyltrichlorosilane, methyl - β-cyanoethyldichlorosilane, etc. Methods for making these cyanoalkylhalosilanes are shown, for example, by Prober Patent 3,185,719, assigned to the same assignee as the present invention.

Sulfonylalkylhalosilanes which are included are, for example, methylsulfonylethylmethyldichlorosilane, methylsulfonylpropyltrichlorosilane, phenylsulfonylpropyltrichlorosilane, 3 - methylsulfonyl - 2 - methylpropyltrichlorosilane, methylsulfonylpropylmethyldichlorosilane, phenylsulfonylpropylmethyldichlorosilane, methylsulfonylbutyltrichlorosilane, etc. Methods for making these sulfones are shown in copending application of Tse C. Wu, Ser. No. 601,876, filed Dec. 15, 1966, and in my copending application, filed concurrently herewith, both assigned to the same assignee as the present invention. For example, addition can be affected between trichlorosilane and an olefinically unsaturated sulfone such as phenylallylsulfone, to produce phenylsulfonylpropyltrichlorosilane.

Haloalkylhalosilanes which are included are, for example, chloropropyltrichlorosilane, bromopropyltrichlorosilane, chloropropylmethyldichlorosilane, etc. Methods for making these haloalkyl compounds are well known and include, for example, SiH addition of a compound such as trichlorosilane to allyl chloride, as shown in Speier Patent 3,321,594.

Isocyanatoalkylhalosilanes which are included are, for example, isocyanatopropyltrichlorosilane, isocyanatopropylmethyldichlorosilane, isocyanatobutyltrichlorosilane, isocyanatopropyldimethylchlorosilane, etc. Methods for making the isocyanates are shown, for example, by Speier Patent 3,170,891.

Organothioalkylhalosilanes which are included, are methylthiopropyltrichlorosilane, phenylthiopropyltrichlorosilane, methylthioethyltrichlorosilane, ethylthiothyltrichlorosilane, etc. Methods for making these sulfide halosilanes are well known and include, for example, addition of a mercaptan to a vinylhalosilane in the presence of ultra violet light.

Alkoxyalkylhalosilanes which are included are ethoxypropyltrichlorosilane, methoxypropyldimethylchlorosilane, fluoroalkylethers, such as β′,β′,β′-trifluoroethoxyethyltrichlorosilane, β′,β′,β′ - trifluoroethoxyethylmethyldichlorosilane, β′,β′,β′-trifluoroethoxypropyltrichlorosilane. Methods for making some of these ethers, are shown for example, by Schmidt Patent 3,132,117, assigned to the same assignee as the present invention.

Some of the tertiary amines which can be employed in the practice of the invention are shown by Bluestein Patent 2,971,972, which is assigned to the same assignee as the present invention. There is included, for example, trialkylamines such as triethylamine, tributylamine, tripropylamine, trihexylamine, trioctylamine, etc. Other tertiary amines, which can be employed are, for example, substituted heterocyclicamines such as N-methylpiperidine, N - methylmorpholine, N - methylethyleneimine, N-methylpyrrolidine, etc. Additional tertiary amines are tri-ethylenediamine, N,N,N′,N′ - tetramethylethylenediamine, N,N,N′,N′ - tetraethylpropylenediamine, N,N,N′,N′ - tetramethyldiaminomethane, etc.

In the practice of the invention, a mixture of the organosilicontrihydride, organofunctional halosilane and tertiary amine is heated at an elevated temperature. An organofunctional-alkylsiliconhydride is formed which is distilled from the reaction mixture.

The order of addition of the various ingredients to the mixture is not critical. Preferably, a sufficient amount of organosilicontrihydride is employed to provide for about 1 gram atom of hydrogen, per mole of the organofunctional halosilane. However, more or less of the organosilicontrihydride will provide for effective results. It has been found that the tertiary amine is most effectively utilized at from about 4 mole percent to about 8 mole percent, based on the total moles of organosilicontrihydride, organofunctional halosilane, and tertiary amine in the mixture. Higher amounts of tertiary amine, such as up to 50 mole percent or higher, based on the total moles of components in the mixture, also can be employed without adverse results. Depending upon the temperature employed, which can vary from 90° C. to as high as 180° C. or higher, depending upon the boiling points of the reactants, and preferably from 120° C. to 150° C., reaction times can be as little as 3 hours or less to as many as 15 hours or more. Recovery of the organofunctional-alkylsilicon hydride can be achieved by standard fractional distillation procedures.

In order that those skilled in the art will be better able to practice the invention the following examples are given by way of illustration and not by way of limitation. All parts are by weight.

Example 1

A mixture of chloropropyltrichlorosilane, hexylsilane, and tributylamine was heated at 130° C. for a period of 3 hours. There was employed a proportion of about 3 moles of chloropropyltrichlorosilane, per mole of hexylsilane, and 7 mole percent of butylamine based on the total moles of the components of the mixture. A sample of the mixture was removed and analyzed by a vapor phase chromatograph. It showed that the mixture consisted principally of chloropropyldichlorosilane and hexyldichlorosilane. The mixture was then fractionated. There was obtained 28 parts of a product boiling at 42°–46° C. at 60 mm. This represented about 80% yield of product, based on starting reactants. Based on method of preparation, the product was γ-chloropropyldichlorosilane of the formula,

$ClCH_2CH_2CH_2Si(Cl)_2H$

Example 2

A mixture consisting of dodecylsilane, 3-trichlorosilylpropionitrile, and N,N,N′,N′-tetramethylethylenediamine was heated under a nitrogen atmosphere at 130° C. for five hours. There was employed about 3 moles of the 3-trichloropropionitrile, per mole of dodecylsilane and 8 mole percent of N,N,N′,N′-tetramethylethylenediamine, based on the total moles of ingredients in the mixture. The mixture was then fractionated. There was obtained an 80% yield of product boiling at 65° C. at 5 mm. Based on method of preparation, the product was cyanoethyldichlorosilane of the formula,

$CNCH_2CH_2Si(Cl)_2H$

Example 3

A mixture consisting of vinyltrichlorosilane, hexylsilane and tributylamine is heated under pressure at 130° C. for five hours. There is employed about five moles of vinyltrichlorosilane, per mole of hexylsilane and 8 mole percent of tributylamine based on the total moles of components in the mixture. The pressure vessel is cooled and a sample is withdrawn. A vapor phase chromatograph of a portion of the mixture indicates the presence of vinyldichlorosilane. The mixture is then fractionally distilled. There is obtained an 85% yield of product boiling at 83ᵇ C. Based on its vapor phase chromatograph, and boiling point, the product is vinyldichlorosilane of the formula

$CH_2=CHSi(Cl)_2H$

Example 4

A mixture of 2-methyl-3-(dichloromethylsilyl)propylmethylsulfone, hexylsilane and triethylamine was heated to 140° C. under a nitrogen atmosphere. There was employed about 3 moles of the sulfone, per mole of hexylsilane, and 7 mole percent of triethylamine based on the total moles of ingredients in the mixture. The mixture was maintained at 140° C. for 7 hours. A vapor phase chromatograph of a portion of the mixture indicated that redistribution had occurred. The mixture was fractionated and a product was recovered at 142°–144° C. at 2 mm. The product was obtained at a 40% yield. Based on the method of preparation and its infrared spectrum, the product was 2 - methyl-3-(chloromethylsilyl) propylmethylsulfone of the formula,

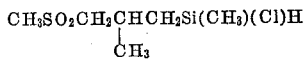

Example 5

A mixture of trichlorosilylpropylisocyanate, dodecylsilane and triethylamine was heated at 130° C. for five hours. There was employed about 3 moles of the trichlorosilylpropylisocyanate, per mole of the dodecylsilane and 8 moles percent of triethylamine based on the total moles of components in the mixture. The mixture was then fractionated. There was obtained a 45% yield of product which distilled at 62°–63° C. at 2 mm. Based on method of preparation and its infra-red spectrum, the product was dichlorosilylpropylisocyanate of the formula, $$OCNCH_2CH_3CH_2Si(Cl)_2H$$

Example 6

A mixture consisting of $\beta',\beta',\beta'$ - trifluoroethoxyethyltrichlorosilane, dodecylsilane and tri-n-butylamine was heated at 140° C. under an inert atmosphere for 5 hours. There was employed three moles of the fluoroethoxysilane, per mole of the dodecylsilane, and 6 mole percent of tri-n-butylamine, based on the total moles of components in the mixture. The mixture was then fractionated. A 55% yield of product was obtained at 52°–54° C. at 22 mm. Based on method of preparation and its infra-red spectrum, the product was $\beta',\beta',\beta'$-trifluoroethoxyethyldichlorosilane of the formula, $$CF_3CH_2OCH_2CH_2Si(Cl)_2H$$

Example 7

A mixture of trichlorosilylethylmethylsulfide, decylsilane and N,N,N',N' - tetramethylethylenediamine is heated at 130° for five hours under a nitrogen atmosphere. There is employed about 3 moles of the silylsulfide, per mole of the decylsilane, and about 8 mole percent of the diamine based on the total moles of ingredients in the mixture. The mixture is then fractionated. An 80% yield of product is obtained. Based on the method of preparation, the product is chlorosilylethylmethylsulfide of the formula, $$CH_3SC_2H_4Si(Cl)_2H$$

Example 8

A mixture of 2 - methyl-3-chloropropyltrichlorosilane, octadecylsilane, and tri-n-butylamine was heated under a nitrogen atmosphere for 5 hours at a temperature of 120° C. There was utilized in the mixture about 3 moles of the chloropropylsilane, per mole of the octadecylsilane, and about 8 mole percent of tri-n-butylamine based on the total moles of ingredients in the mixture. The mixture was then fractionally distilled. There was obtained a 60% yield of product having a boiling range of 46°–55° C. at 4.6 mm. Based on the method of preparation and its infrared spectrum the product was 2-methyl-3-chloropropyldichlorosilane of the formula,

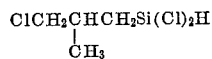

Example 9

A reaction mixture of dodecylsilane, 1-methylcyanoethyltrichlorosilane, and tributylamine is heated under a nitrogen atmosphere for five hours at a temperature of 120° C. There is utilized about 3 moles of 1-methylcyanoethyltrichlorosilane, per mole of the dodecylsilane and about 8 mole percent of tributylamine based on the total moles of components in the mixture. A vapor phase chromatograph of a portion of the mixtures shows that there is a 65% yield of 1-methylcyanoethyldichlorosilane. The presence of the cyanoethyldichlorosilane is confirmed by its infrared spectrum.

While the foregoing examples have been limited to only a few of the very many variable within the scope of the present invention, it should be understood that the present invention is directed to the production of a much broader class of organofunctional-alkylsiliconhydrides as shown by Formula 1, which can be made by heating a mixture of an organosiliconhydride of Formula 2, and an organofunctionalhalosilane of Formula 3 in the presence of a tertiary amine as shown in the description of the present invention preceding these examples.

What I claim as new and desire to secure by Letters Patent of the United States is:

1. A method for making an organofunctional-alkylsiliconhydride of the forumla, $$QSiY(Y')H$$

which comprises (1) heating a mixture of (A) an organosiliconhydride of the formula, $$RSiH_3$$

(B) an organofunctional-halosilane of the formula, $$QSiY_2Y'$$

and (C) a tertiary-amine, and (2) recovering the organofunctional-alkylsiliconhydride from the mixture of (1), where there is utilized in said mixture of (1), from about 1.5 to 6 moles of (B), per mole of (A), and at least about 0.5 bole percent of (C), based on the total moles of (A), (B) and (C), Q is a monovalent organofunctional radical selected from aliphatically unsaturated monovalent hydrocarbon radicals, haloalkyl radicals having 3 to 8 carbon atoms, cyanoalkyl radicals, isocyanatoalkyl radicals, organothioalkyl radicals, organosulfonylalkyl radicals, alkoxyalkyl radicals and fluoroalkoxyalkyl radicals, R is a member selected from alkyl radicals and alkaryl radicals, Y is a halogen radical, Y' is a member selected from Y and monovalent hydrocarbon radicals.

2. A method in accordance with claim 1, where the organofunctional-halosilane is a cyanoalkylhalosilane.

3. A method in accordance with claim 1, where the organofunctional-halosilane is an isocyanatoalkylhalosilane.

4. A method in accordance with claim 1, where the organofunctional-halosilane is an organothioalkylhalosilane.

5. A method in accordance with claim 1, where the oragonfunctional-halosilane is an organosulfonylalkylhalosilane.

6. A method in accordance with claim 1, where the organofunctional-halosilane is a haloalkylhalosilane.

7. A method in accordance with claim 1, where the organofunctional-halosilane is a halosilane having an aliphatically unsaturated hydrocarbon radical attached to silicon by carbon-silicon bonds.

8. A method in accordance with claim 1, where the organofunctional-halosilane is a fluoroalkoxyalkylhalosilane.

9. A method in accordance with claim 1, where the organofunctional-halosilane is an alkoxyalkylhalosilane.

10. A method in accordance with claim 1, which comprises (1) heating a mixture at a temperature in the range of between about 120° C. to 150° C. of (A) hexylsilane, (B) chloropropyltrichlorosilane and (C) tri - n - butylamine, where there is utilized about 3 moles of (B), per mole of (A), and about 4 to 8 mole percent of (C), based on the total moles of (A), (B) and (C), and (2) distilling the resulting mixture of (1), to provide for the recovery of chloropropyldichlorosilane.

11. A method in accordance with claim 1, which comprises (1) heating a mixture at a temperature in the range of between 120° C. to 150° C. of (A) dodecylsilane, (B) β-cyanoethyltrichlorosilane, and (C) N,N,N',N'-tetramethylenediamine, where there is utilized about 3 moles of (B) per mole of (A) and about 4 to 8 mole percent of (C), based on the total moles of (A), (B) and (C), and (2) distilling the mixture of (1), to provide for the recovery of β-cyanoethyldichlorosilane.

References Cited
UNITED STATES PATENTS

| | | | |
|---|---|---|---|
| 2,834,648 | 5/1958 | Bailey et al. | 260—448.2 XR |
| 3,322,511 | 5/1967 | Weyenberg | 260—448.2 XR |
| 3,362,977 | 1/1968 | Berger | 260—448.2 |
| 3,399,222 | 8/1968 | Weyenberg | 260—448.2 |

TOBIAS E. LEVOW, Primary Examiner

J. P. PODGORSKI, Assistant Examiner

U.S. Cl. X.R.

260—448.2